United States Patent
Luo

(10) Patent No.: US 10,284,479 B2
(45) Date of Patent: May 7, 2019

(54) METHOD AND SYSTEM FOR NETWORK CONGESTION CONTROL

(71) Applicant: Sangfor Technologies Company Limited, Shenzhen (CN)

(72) Inventor: Dean Luo, Shenzhen (CN)

(73) Assignee: SANGFOR TECHNOLOGIES INC., Shenzhen (CN)

(*) Notice: Subject to any disclaimer, the term of this patent is extended or adjusted under 35 U.S.C. 154(b) by 175 days.

(21) Appl. No.: 14/849,714

(22) Filed: Sep. 10, 2015

(65) Prior Publication Data

US 2016/0080265 A1 Mar. 17, 2016

(30) Foreign Application Priority Data

Sep. 11, 2014 (CN) .......................... 2014 1 0462572

(51) Int. Cl.
*H04L 12/801* (2013.01)
*H04L 12/807* (2013.01)
*H04L 12/825* (2013.01)

(52) U.S. Cl.
CPC .............. *H04L 47/25* (2013.01); *H04L 47/12* (2013.01); *H04L 47/27* (2013.01)

(58) Field of Classification Search
CPC ... H04L 1/1887; H04L 1/0017; H04L 1/1848; H04L 1/0002; H04L 1/1858; H04L 47/12; H04L 47/27; H04L 47/25; H04L 47/10; H04L 29/00
See application file for complete search history.

(56) References Cited

U.S. PATENT DOCUMENTS

| | | | | |
|---|---|---|---|---|
| 5,949,757 A | * | 9/1999 | Katoh | H04L 43/00 370/232 |
| 2002/0136163 A1 | * | 9/2002 | Kawakami | H04L 47/26 370/229 |
| 2003/0193893 A1 | * | 10/2003 | Wen | H04L 12/5602 370/231 |
| 2012/0215926 A1 | * | 8/2012 | Yang | H04L 67/141 709/227 |
| 2015/0250016 A1 | * | 9/2015 | Kotecha | H04W 76/064 370/329 |

* cited by examiner

*Primary Examiner* — Marsha D Banks Harold
*Assistant Examiner* — Dharmesh J Patel
(74) *Attorney, Agent, or Firm* — Anova Law Group, PLLC

(57) ABSTRACT

A network congestion control method is provided. The method includes detecting whether a new network connection is established by a source endpoint; obtaining a destination endpoint of the new network connection when it is detected that a new network connection is established by a source endpoint; and assigning the new network connection to an established network group corresponding to the destination endpoint of the new network connection. Further, the method includes, based on a predefined network congestion control mechanism for each network group, obtaining a data transfer rate of each network group and controlling the data transfer rate of each network group to control data transfer rates of network connections in each network group including the new network connection.

14 Claims, 5 Drawing Sheets

METHOD AND SYSTEM FOR NETWORK CONGESTION CONTROL

CROSS-REFERENCES TO RELATED APPLICATIONS

This application claims priority of Chinese Patent Application No. 201410462572.1, filed on Sep. 11, 2014, the entire contents of which are incorporated by reference herein.

FIELD OF THE INVENTION

The present invention generally relates to the field of communication technologies and, more particularly, to a method and system for network congestion control.

BACKGROUND

Currently, when network congestion control mechanisms are applied on network connections to control network congestion, in general, the congestion control is applied independently on each individual network connection. In many situations, there may be a plurality of network connections existing at the same time between two endpoints. When the congestion control is applied independently on each individual network connection, it may have many disadvantages.

For example, when the congestion control mechanism is started, there is an adjustment period and, because the network bandwidth is unknown, a long detecting process may be needed during the adjustment period, resulting in poor bandwidth utilization rate in the adjustment period. Further, when congestion control process, the individual network connections may interfere with one another. Also, it may be difficult to achieve a fair bandwidth allocation among all network connections.

It should be noted that the above information is only used to assist in understanding the technical aspects of the present invention, and it does not represent that such information is prior art. The disclosed methods and systems are directed to solve one or more problems set forth above and other problems in the art.

BRIEF SUMMARY OF THE DISCLOSURE

One aspect of the present invention provides a network congestion control method. The method includes detecting whether a new network connection is established by a source endpoint; obtaining a destination endpoint of the new network connection when it is detected that a new network connection is established by a source endpoint; and assigning the new network connection to an established network group corresponding to the destination endpoint of the new network connection. Further, the method includes, based on a predefined network congestion control mechanism for each network group, obtaining a data transfer rate of each network group and controlling the data transfer rate of each network group to control data transfer rates of network connections in each network group including the new network connection.

Another aspect of the present invention provides a network congestion control system. The system includes a detecting module, an obtaining module, an assignment module and a congestion control module. The detecting module is configured to detect whether a new network connection is established by a source endpoint. The assignment module is configured to assign the new network connection to an established network group corresponding to the destination endpoint of the new network connection. Further, the congestion control module is configured to, based on a predefined network congestion control mechanism for each network group, obtain a data transfer rate of each network group and to control the data transfer rate of each network group to control data transfer rates of network connections in each network group including the new network connection.

Other aspects of the present disclosure can be understood by those skilled in the art in light of the description, the claims, and the drawings of the present disclosure.

The implementations, features and advantages of the present invention will be further described with embodiments and accompanying drawings.

DETAILED DESCRIPTION

In order for those skilled in the art to better understand the technical solutions of the present invention, the followings together with accompanying drawings describe in detail the present invention with specific embodiments. The specific embodiments described herein are merely to illustrate the present invention and are not to limit the present invention.

As understood by those skilled in the art, the disclosed network congestion control methods may be implemented in any appropriate network system, such as a server, a gateway device, or any system capable of implementing the disclosed methods for network congestion control. For illustrative purposes, the followings describe the network congestion control methods with respect to a network gateway device as the implementation entity, without any limitation.

Figure 1:
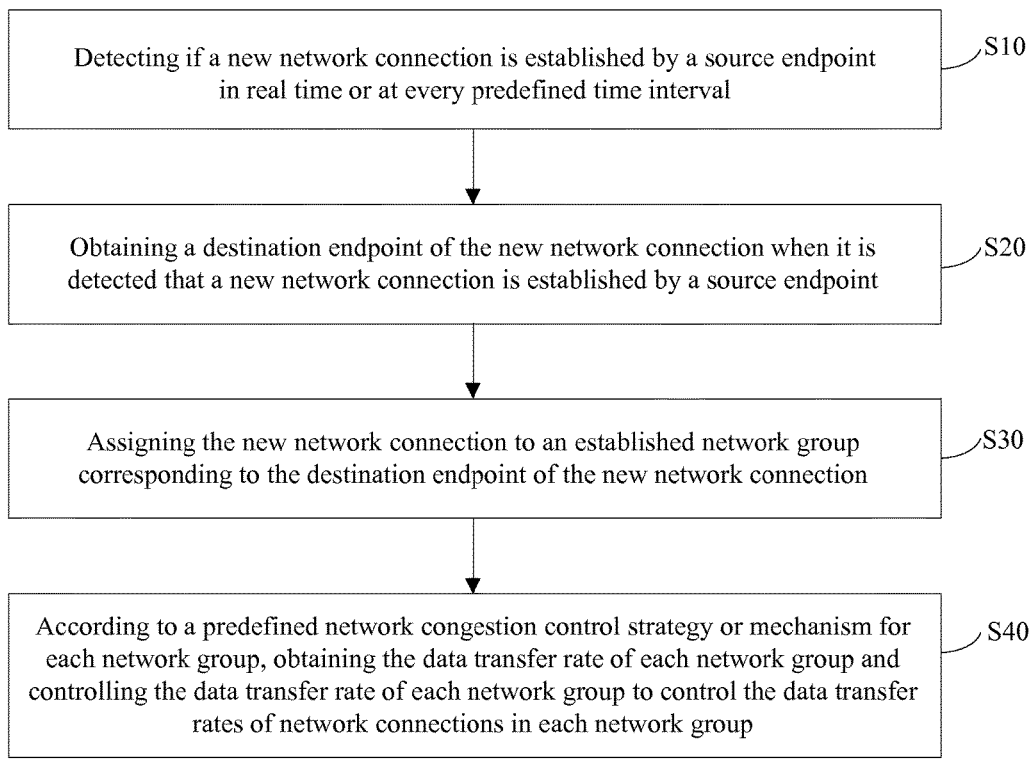
FIG. 1 illustrates a schematic flow chart of an exemplary network congestion control process consistent with the disclosed embodiments.

FIG. 1 illustrates a schematic flow chart of an exemplary network congestion control process consistent with the disclosed embodiments. As shown in FIG. 1, the network congestion control process may include the following steps.

Step S10, in real time or at every predefined time interval, detecting if a new network connection is established by a source endpoint.

A source endpoint, as used herein, may refer to any appropriate network device or any appropriate network connection point, such as a web server, a game server, or any other server, or a user terminal. More specifically, a gateway may be used to monitor a plurality of source endpoints and to detect a new network connection established by a source endpoint, based on one or more predetermined detection algorithms.

Step S20, when it is detected that a new network connection is established by a source endpoint, obtaining a destination endpoint of the new network connection.

For example, the destination endpoint of the new network connection may be determined by a destination IP address and/or a destination port number of the new network connection. More specifically, the gateway may obtain the destination endpoint of the new network connection using any appropriate method.

Step S30, assigning the new network connection to an established network group corresponding to the destination endpoint of the new network connection.

Different network connections with a same destination endpoint may have competitive relationships among each other for the allocation of data transfer rate/bandwidth. Also, those network connections which have the same destination endpoint may interfere with each other. On the other hand, network connections with different destination endpoints may have less competition in allocation of the data transfer rate/bandwidth, and there may be less interference among these network connections with different destination endpoints.

When there is an established network group corresponding to the destination endpoint of the new network connection, the new network connection is assigned to the established network group. When there is not an established network group corresponding to the destination endpoint of the new network connection, either the new network connection is not processed, or a new network group is created and the new network connection is assigned to this newly created network group.

Further, the bandwidth resource for the new network connection may be determined to match an established network group. For example, when it is determined that the destination endpoint of the new network connection is in the same LAN (local area network) as the destination endpoint(s) of network connection(s) in an established network group, the bandwidth resource of the new network connection is determined to match the established network group.

For another example, when it is determined that the new network connection is established at the same time or in the same time period as the network connection(s) in an established network group, the bandwidth resource of the new network connection is determined to match the established network group.

Step S40, according to a predefined network congestion control strategy or mechanism for each network group, obtaining the data transfer rate of each network group and controlling the data transfer rate of each network group to control the data transfer rates of network connections in each network group.

Specifically, according to existing network congestion control mechanisms, the bandwidth of each network group can be obtained, and such bandwidth is a maximum data transfer rate of each network group. Based on the configuration of a user or the gateway, the obtained bandwidth may be allocated evenly among all the network connections in the network group, or may be allocated based on a predefined percentage or ratio among all the network connections in the network group. Thus, the data transfer rates of the network connections in each network group is controlled or rated.

Thus, according to the disclosed network congestion control method, the congestion control is performed on the network group as a unit. The maximum data transfer rate of the network group can be obtained when the network group is created. It may be unnecessary to detect data transfer rate of each network connection respectively when each network connection is established. Therefore, the bandwidth utilization may be improved. Further, the bandwidth is allocated among network connections according to the destination endpoint of each network connection, so the interference among all the network connections can be avoided. Thus, a fair bandwidth allocation among all the network connections can be achieved.

Figure 2:
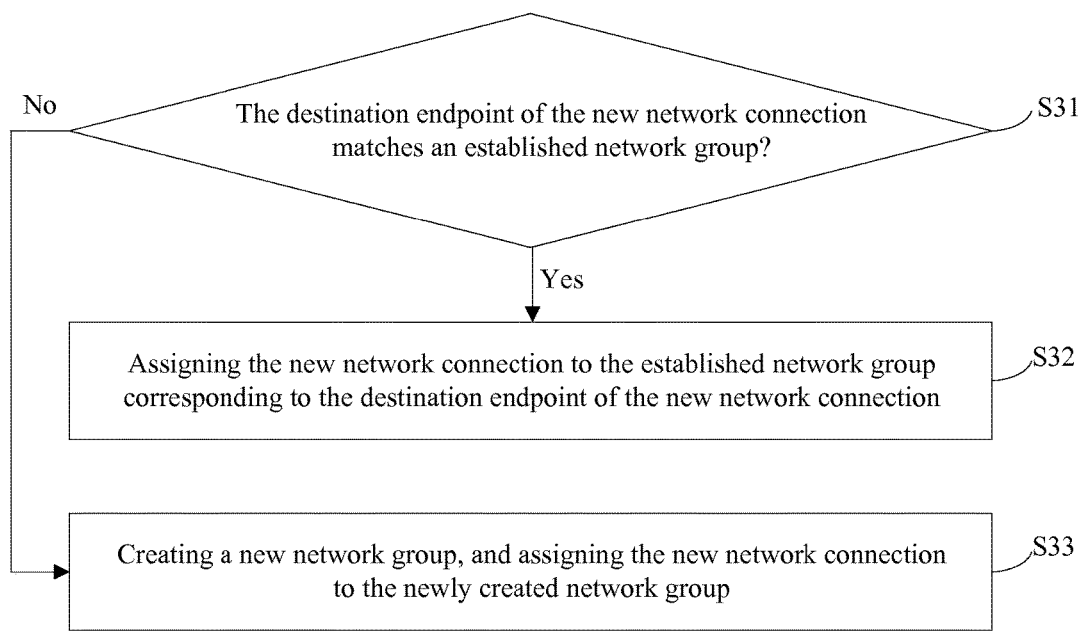
FIG. 2 illustrates a schematic flow chart of another exemplary network congestion control process consistent with the disclosed embodiments.

FIG. 2 illustrates a schematic flow chart of another exemplary network congestion control process consistent with the disclosed embodiments. Based on the disclosed network congestion control process illustrated in FIG. 1, Step S30 may further include the following steps.

Step S31, it is determined whether the destination endpoint of the new network connection matches an established network group. For example, it can be determined whether the destination endpoint of the new network connection matches a destination endpoint of an existing network connection in the established network group.

Step S32, if it is determined that the destination endpoint of the new network connection matches an established network group, the new network connection is assigned to the established network group corresponding to the destination endpoint of the new network connection.

Step S33, if it is determined that the destination endpoint does not match any established network group, a new network group is established and the new network connection is assigned to the newly created network group.

Alternatively, if it is determined that the destination endpoint does not match any established network group, the new network connection is not assigned to any network group, i.e., the new network connection is not grouped. For those network connections which are not assigned to a network group, the data transfer rates can be controlled or rated independently.

In addition, in certain embodiments, based on the disclosed network congestion control methods illustrated in FIG. 1 and FIG. 2, Step S40 (obtaining the data transfer rate of each network group and controlling the data transfer rate of each network group to control the data transfer rates of network connections in each network group) may further include: based on a congestion window of the network group obtained when the network group is created, controlling the data transfer rate of each network group to control the data transfer rates of network connections in each network group. The congestion window may be calculated using one or more predetermined algorithms.

According to the obtained congestion window of the network group, a maximum number of packets which can be sent in an RTT (Round Trip Time) for the network group can be obtained, which can be used to control or rate the data transfer rate of the network group.

In certain embodiments, the bandwidth of each network group, e.g., maximum data transfer rate of network group, can also be obtained. Based on the maximum data transfer rate of each network group, a transmission data rate of each network group can be controlled or rated.

Figure 3:
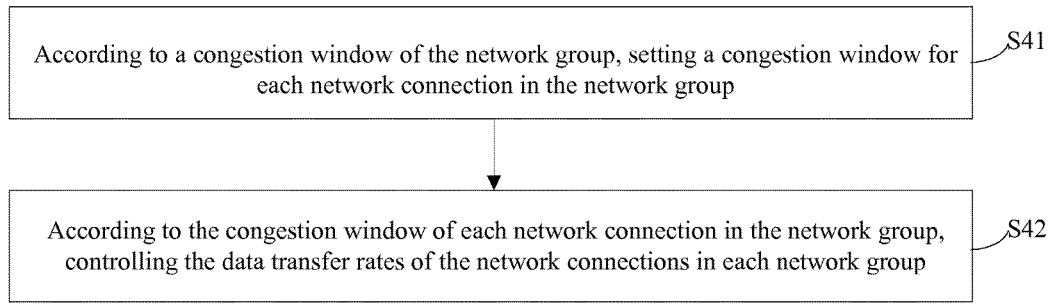
FIG. 3 illustrates a schematic flow chart of another exemplary network congestion control process consistent with the disclosed embodiments.

FIG. 3 illustrates a schematic flow chart of another exemplary network congestion control process consistent with the disclosed embodiments. Based on the disclosed network congestion control processes illustrated in FIGS. 1 and 2, Step S40 (obtaining the data transfer rate of each network group and controlling the data transfer rate of each network group to control the data transfer rates of network connections in each network group) may further include the following steps.

Step S41, according to the congestion window of the network group, setting a congestion window for each network connection in the network group.

Step S42, based on the congestion window of each network connection in the network group, controlling the data transfer rates of the network connections in each network group. A pre-transmission data size of each network connection may be obtained through an application in application layer.

Accordingly, based on the user's demands, the value of the congestion window of the network group may be allocated in a predefined percentage or ratio or be allocated evenly to obtain the congestion window of each network connection. Further, the congestion window of each network connection may also be set or configured based on RTT, packet loss, used bandwidth, and/or other information of each network connection.

In certain embodiments, the bandwidth of each network group, e.g., the maximum data transfer rate, is obtained. Based on the maximum data transfer rate, the data rate of each network group is controlled or rated. According to the pre-transmission data size of each network connection in the network group, or based on a principle of allocating evenly or in the predefined percentage or ratio, the data rate of each network connection within a time period or at a particular time can be allocated.

Based on the network congestion control method illustrated in FIG. 3, in another embodiment, step S41 may further include the following steps.

The data volume to be sent by each network connection in the network group is obtained. Based on a proportional rule between the to-be-sent data volume and the congestion window of the network connection, the congestion window of each network connection in the network group is set or configured.

Thus, the congestion window of each network connection is set or configured based on the to-be-sent data volume of each network connection in the network group, and the data transfer rate of each network connection in the network group can be more accurately controlled or rated.

Figure 4:
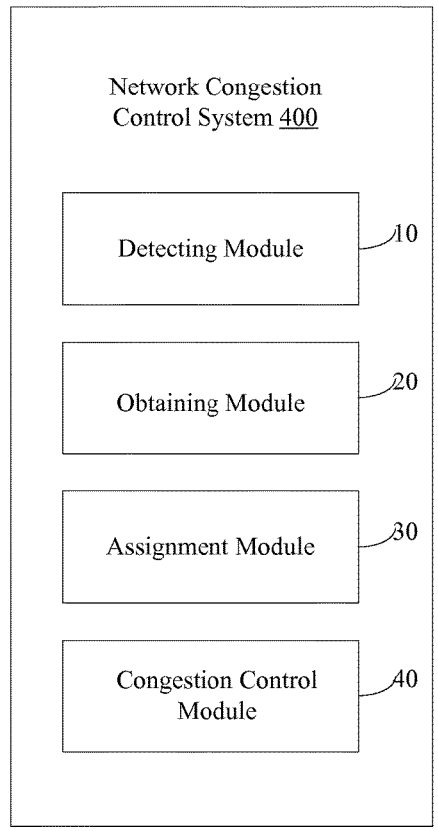
FIG. 4 illustrates a schematic functional block diagram of an exemplary network congestion control system consistent with the disclosed embodiments.

FIG. 4 illustrates a schematic functional block diagram of an exemplary network congestion control system. As shown in FIG. 4, the network congestion control system 400 includes a detecting module 10, an obtaining module 20, an assignment module 30, and a congestion control module 40. Other modules may also be included.

The detecting module 10 is configured to detect if a new network connection is established by a source endpoint. The obtaining module 20 is configured to, when it is detected that a new network connection is established by a source endpoint, obtain a destination endpoint of the new network connection.

The assignment module 30 is configured to assign the new network connection to an established network group corresponding to the destination endpoint of the new network connection. And the congestion control module 40 is configured to, based on a predefined network congestion control strategy or mechanism for each network group, obtain the data transfer rate of each network group and to control the data transfer rate of each network group to control the data transfer rates of network connections in each network group.

The source endpoint may be a web server, a game server, or any other server. The source endpoint may also be a user terminal. The detecting module 10 may use any appropriate mechanism to detect the source endpoint whether the new network connection is established.

The destination endpoint of the network connection may be determined by a destination IP address and/or a destination port of the network connection. The obtaining module 20 may obtain a bandwidth resource of the destination endpoint of the network connection.

Different network connections with a same destination endpoint may have competitive relationships among each other for the allocation of data transfer rate/bandwidth. Also, those network connections which have the same destination endpoint may interfere with each other. On the other hand, network connections with different destination endpoints may have less competition in allocation of the data transfer rate/bandwidth, and there may be less interference among these network connections with different destination endpoints.

Further, the bandwidth resource for the new network connection may be determined to match an established network group. For example, when it is determined that the destination endpoint of the new network connection is in the same LAN (local area network) as the destination endpoint(s) of network connection(s) in an established network group, the bandwidth resource of the new network connection is determined to match the established network group.

For another example, when it is determined that the new network connection is established at the same time or in the same time period as the network connection(s) in an established network group, the bandwidth resource of the new network connection is determined to match the established network group.

When it is determined that the destination endpoint of the new network connection matches an established network group, the new network connection is assigned to the established network group corresponding to the destination endpoint of the new network connection. When it is determined that the destination endpoint does not match any established network group, the new network connection is not assigned to any network group, i.e., the new network connection is not grouped, or a new network group is established and the new network connection is assigned to the newly created network group.

Further, through existing network congestion control mechanisms, the bandwidth of each network group can be obtained, and such bandwidth is a maximum data transfer rate of each network group. Based on the configuration of a user or the gateway, the obtained bandwidth may be allocated evenly among all the network connections in the network group, or may be allocated based on a predefined percentage or ratio among all the network connections in the network group. Thus, the data transfer rates of the network connections in each network group is controlled or rated.

Thus, according to the disclosed network congestion control system, the congestion control is performed on the network group as a unit. The maximum data transfer rate of the network group can be detected only when the network group is established, and it may be unnecessary to detect respectively each network connection when the individual network connection is established. Thus, the utilization of the network bandwidth is improved. Further, the network bandwidth is allocated among network connections according to the destination endpoint of each network connection, avoiding mutual interference. Therefore, a fair network resource allocation may be achieved.

Figure 5:
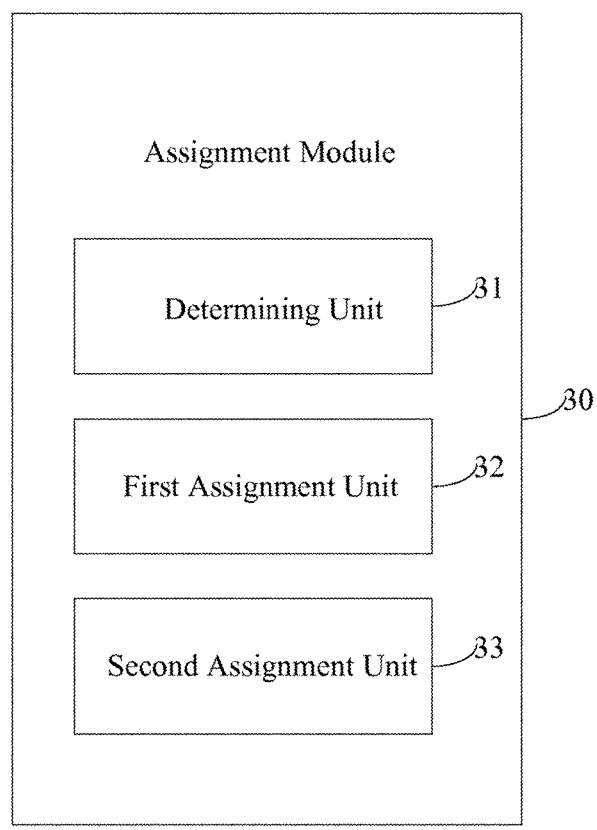
FIG. 5 illustrates a schematic functional block diagram of an assignment module consistent with the disclosed embodiments.

FIG. 5 illustrates a schematic functional block diagram of an exemplary assignment module. Based on the disclosed network congestion control system illustrated in FIG. 4, the assignment module 30 may further include a determining unit 31, a first assignment unit 32, and a second assignment unit 33.

The determining unit 31 is configured to determine whether the destination endpoint of the new network connection matches an established network group.

The first assignment unit 32 is configured to assign the new network connection to the established network group corresponding to the destination endpoint of the new network connection when the determining unit 31 determines that the destination endpoint of the new network connection matches an established network group.

Further, the second assignment unit 33 is configured to create a new network group and to assign the new network connection to the newly created network group when the determining unit 31 determines that the destination endpoint of the new network connection does not match an established network group.

In certain embodiments, when the determining unit 31 determines that the destination endpoint of the new network connection does not match an established network group, the second assignment unit 33 is configured not to the new network connection to any network group, i.e., the new network connection is not grouped. For those network connections which are not assigned to a network group, the data transfer rates can be controlled or rated independently.

In another embodiment of the network congestion control system, the congestion control module 40 may also be configured to control or rate the data transfer rate of the network group according to a congestion window obtained when the network group is created to control the data transfer rates of network connections in each network group. The congestion window may be calculated using one or more predetermined algorithms.

According to the obtained congestion window of the network group, a maximum number of packets which can be sent in an RTT (Round Trip Time) for the network group can be obtained to control or rate the data transfer rate of the network group.

In certain embodiments, the bandwidth of each network group, e.g., maximum data transfer rate of network group, can also be obtained. Based on the maximum data transfer rate of each network group, a transmission data rate of each network group can be controlled or rated.

Figure 6:
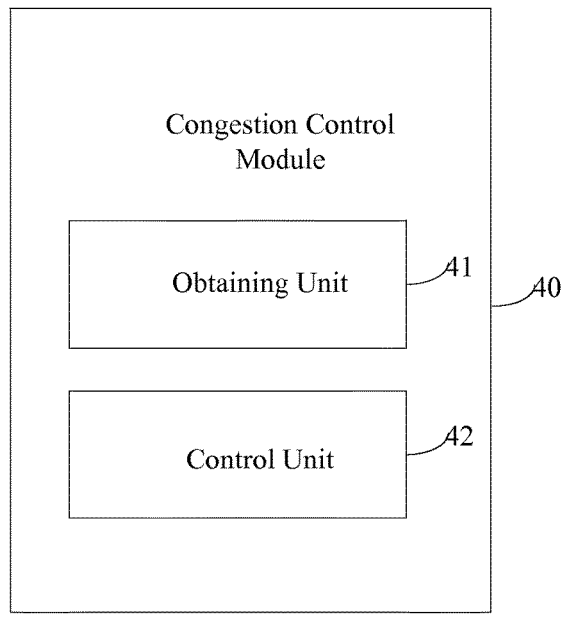
FIG. 6 illustrates a detailed schematic functional block diagram of a congestion control module consistent with the disclosed embodiments.

FIG. 6 illustrates a schematic functional block diagram of a network congestion control module 40. As shown in FIG. 6, the congestion control module 40 may further include an obtaining unit 41 and a controlling unit 42.

The obtaining unit 41 is configured to set or configure a congestion window for each network connection in the network group based on the congestion window of the network group.

The controlling unit 42 is configured to the data transfer rates of the network connections in each network group based on the congestion window of each network connection in the network group.

A pre-transmission data size of each network connection may be obtained through an application in application layer. Further, the congestion window of the network group may be allocated in a predefined percentage or be allocated evenly to obtain the congestion window of each network connection according to a user's requirement. Furthermore, the congestion window of each network connection may also be set or configured based on RTT, packet loss, used bandwidth, and/or other information of each network connection.

In certain embodiments, the bandwidth of each network group, e.g., the maximum data transfer rate, is obtained. Based on the maximum data transfer rate, the data rate of each network group is controlled or rated. According to the pre-transmission data size of each network connection in the network group, or based on a principle of allocating evenly or in the predefined percentage or ratio, the data rate of each network connection within a time period or at a particular time can be allocated.

In certain embodiments, the obtaining unit 41 may be also configured to obtain the to-be-sent data volume of each network connection in the network group and to set or configure the congestion window of each network connection in the network group based on a proportional rule between the to-be-sent data volume and the congestion window of the network connection.

Thus, the congestion window of each network connection is set or configured based on the to-be-sent data volume of each network connection in the network group, and the data transfer rate of each network connection in the network group can be more accurately controlled or rated.

Figure 7:
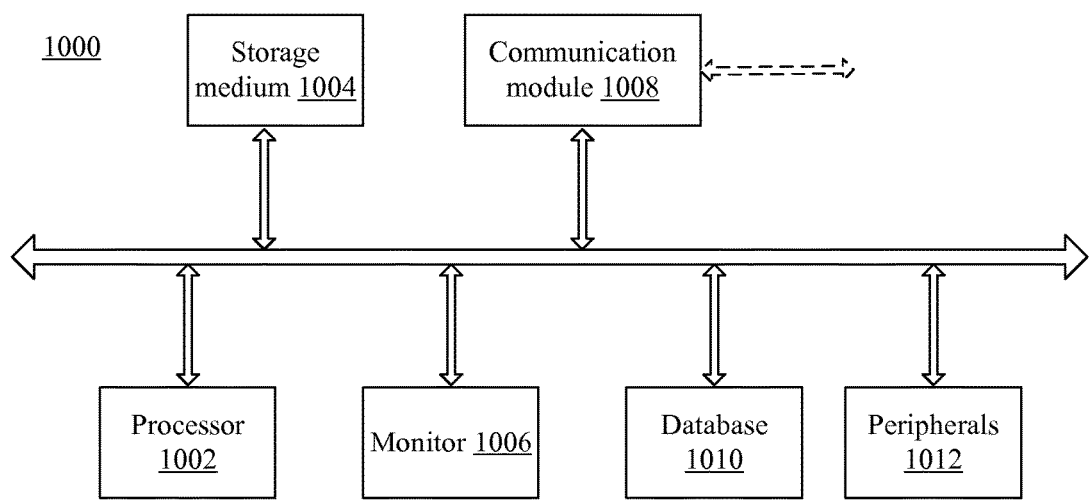
FIG. 7 illustrates a schematic block diagram of an exemplary computer system consistent with the disclosed embodiments.

FIG. 7 illustrates a computer system that may be used to implement the disclosed network congestion control methods and systems. As shown in FIG. 7, the computer system 1000 may include a processor 1002, a storage medium 1004, a monitor 1006, a communication module 1008, a database 1010, and peripherals 1012. Certain devices may be omitted and other devices may be included.

Processor 1002 may include any appropriate processor or processors. Further, processor 1002 can include multiple cores for multi-thread or parallel processing. Storage medium 504 may include memory modules, such as ROM, RAM, flash memory modules, and erasable and rewritable memory, and mass storages, such as CD-ROM, U-disk, and hard disk, etc. Storage medium 1004 may store computer programs for implementing various processes, when executed by processor 1002.

Further, peripherals 1012 may include I/O devices such as keyboard and mouse, and communication module 1008 may include network devices for establishing connections through the communication network. Database 1010 may include one or more databases for storing certain data and for performing certain operations on the stored data, such as database searching.

The embodiments disclosed herein are exemplary only and not limiting the scope of this disclosure. Various alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A network congestion control method, comprising:
   detecting whether a new network connection is established by a source endpoint;
   obtaining a destination endpoint of the new network connection when it is detected that a new network connection is established by a source endpoint;
   determining whether the destination endpoint of the new network connection matches an established network group based on at least one of a destination IP address and a destination port number of the new network connection;
   creating a new network group, assigning the new network connection to the newly created network group, and detecting a data transfer rate of the new network group when it is determined that the destination endpoint does not match any established network group;

assigning the new network connection to the established network group corresponding to the destination endpoint of the new network connection when it is determined that the destination endpoint of the new network connection matches the established network group; and based on a predefined network congestion control mechanism for each network group, obtaining the data transfer rate of each network group and controlling the data transfer rate of each network group to control data transfer rates of network connections in each network group including the new network connection and matching a bandwidth resource of the new network connection with a bandwidth of a network connection of the established network group, wherein the network connection of the established network group is established in a same time period as the new network connection.

2. The network congestion control method according to claim 1, wherein detecting whether a new network connection is established by a source endpoint further includes:

detecting whether a new network connection is established by a source endpoint in real time or in a predefined time interval.

3. The network congestion control method according to claim 1, wherein determining whether the destination endpoint of the new network connection matches an established network group further includes:

determining whether the destination endpoint of the new network connection matches a destination endpoint of an existing network connection in the established network group.

4. The network congestion control method according to claim 3, wherein determining whether the destination endpoint of the new network connection matches a destination endpoint of an existing network connection further includes:

determining whether the destination endpoint of the new network connection is in a same LAN (local area network) as the destination endpoint of the existing network connection in the established network group.

5. The network congestion control method according to claim 1, wherein obtaining a data transfer rate of each network group and controlling the data transfer rate of each network group to control data transfer rates of network connections further includes:

obtaining a congestion window of the network group when the network group is established; and based on the obtained congestion window of the network group, controlling the data transfer rate of the network group.

6. The network congestion control method according to claim 5, wherein controlling the data transfer rate of the network group further includes:

setting a congestion window of each network connection in the network group according to the congestion window of the network group; and controlling the data transfer rates of the network connections in each network group based on the congestion window of each network connection in the network group.

7. The network congestion control method according to claim 6, wherein setting the congestion window of each network connection in the network group further includes:

obtaining a to-be-sent data volume of each network connection in the network group;

setting the congestion window of each network connection in the network group according to a proportional rule between the to-be-sent data volume and the congestion window of each network connection.

8. A network congestion control system, comprising:

a detecting module configured to detect whether a new network connection is established by a source endpoint;

a determining module configured to determine whether a destination endpoint of the new network connection matches an established network group based on at least one of a destination IP address and a destination port number of the new network connection;

an assignment module configured to:

create a new network group, assign the new network connection to the newly created network group, and detect a data transfer rate of the new network group when it is determined that the destination endpoint does not match any established network group, and assign the new network connection to the established network group corresponding to the destination endpoint of the new network connection when the determining module determines that the destination endpoint of the new network connection matches the established network group; and a congestion control module configured to, based on a predefined network congestion control mechanism for each network group, obtain the data transfer rate of each network group and to control the data transfer rate of each network group to control data transfer rates of network connections in each network group including the new network connection and match a bandwidth resource of the new network connection with a bandwidth of a network connection of the established network group, wherein the network connection of the established network group is established in a same time period as the new network connection.

9. The network congestion control system according to claim 8, wherein the detecting module is further configured to:

detect whether a new network connection is established by a source endpoint in real time or in a predefined time interval.

10. The network congestion control system according to claim 8, wherein the determining unit is further configured to:

determine whether the destination endpoint of the new network connection matches a destination endpoint of an existing network connection in the established network group.

11. The network congestion control system according to claim 10, wherein the determining unit is further configured to:

determine whether the destination endpoint of the new network connection is in a same LAN (local area network) as the destination endpoint of the existing network connection in the established network group.

12. The network congestion control system according to claim 8, wherein, the congestion control module is further configured to:

obtaining a congestion window of the network group when the network group is established; and based on the obtained congestion window of the network group, controlling the data transfer rate of the network group.

13. The network congestion control system according to claim 12, wherein the congestion control module further includes:

an obtaining unit configured to set a congestion window of each network connection in the network group according to the congestion window of the network group; and a control unit configured to control the data transfer rates of the network connections in each network group based on the congestion window of each network connection in the network group.

14. The network congestion control system according to claim 13, wherein the obtaining unit is further configured to:

obtain a to-be-sent data volume of each network connection in the network group; and set the congestion window of each network connection in the network group according to a proportional rule between the to-be-sent data volume and the congestion window of each network connection.

* * * * *